Patented Feb. 27, 1934

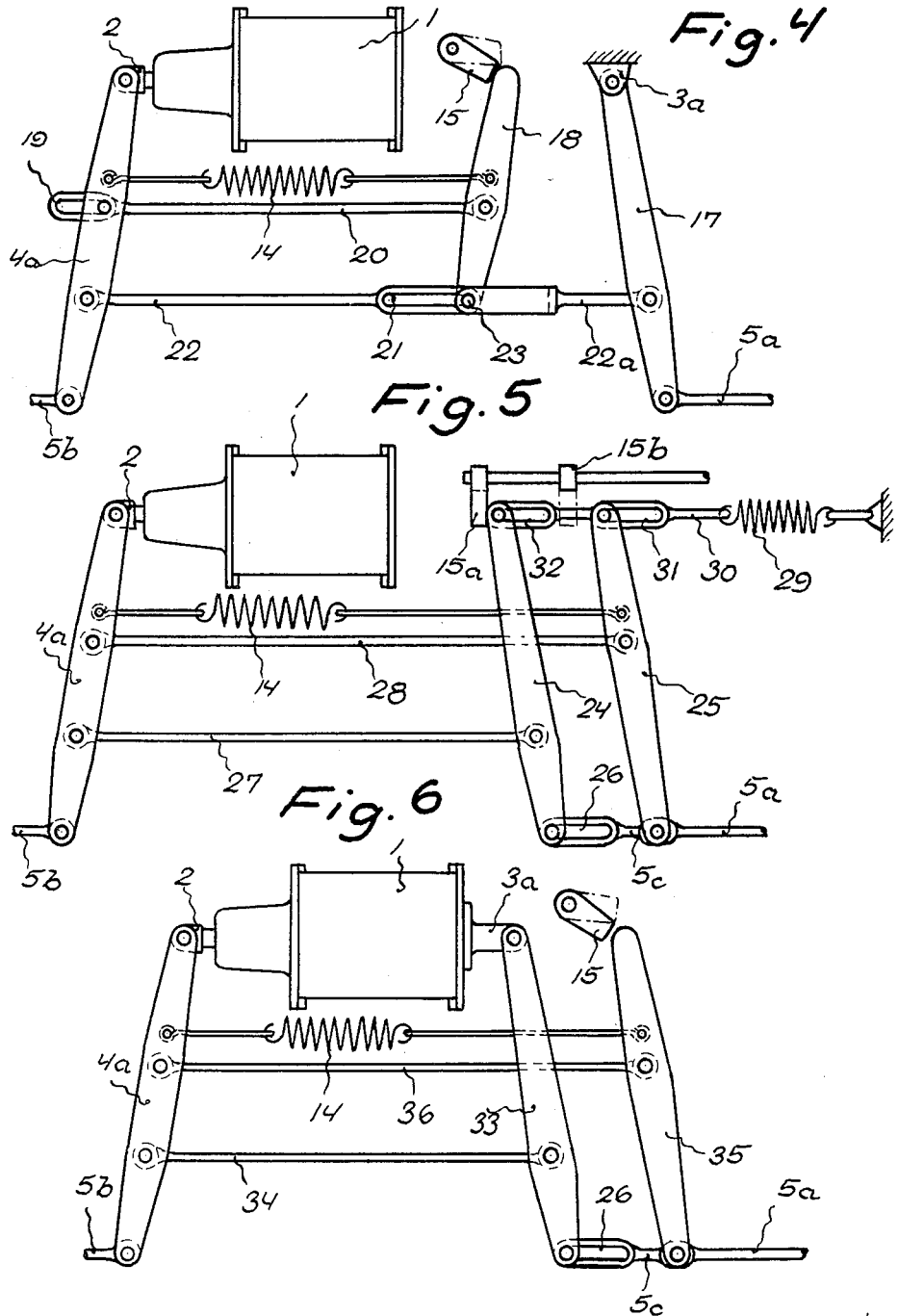

1,949,187

UNITED STATES PATENT OFFICE 1,949,187

VARIABLE LEVERAGE BRAKE RIGGING

Folke Nils Henrik Setterwall, Malmo, Sweden, assignor to Svenska Aktiebolaget Bromsregulator, Malmo, Sweden, a corporation of Sweden Application May 26, 1931, Serial No. 540,170
In Germany June 23, 1930

3 Claims. (Cl. 188—195)

The present invention refers to an improvement in vehicle brakes, especially in brakes for railway cars, and its object is, by variation of the ratio of leverage in the brake rigging between the source of braking power and the brake shoes, to perform a control of the amount of braking power transmitted to the wheels according to the load on the car.

Although not limited thereto, the invention is specially adapted for so-called equalized brake structures of the kind in which the braking power is transmitted towards both ends of the car from a common source of power positioned between the car axles, and is uniformly distributed at the different car axles independent of variations of wear of the brake shoes, and the like. Two different types of equalized brake structures of this kind are employed in practice, i. e. an European type in which two brake pull rods are mounted at the longitudinal axis of the car and extending towards opposite ends thereof, such pull rods by means of a link and lever system being connected with each other and with the source of braking power, the said link and lever system being connected with a fixed point of the under framing of the car positioned at the same side of the longitudinal axis of the same as the source of power. The other type of similar brake structures forms the so-called American type, and this latter differs from the former in that the two pull rods extending towards the opposite ends of the car are not positioned at the longitudinal axis of the same but symmetrically at opposite sides of said axis, and the fixed point of the link and lever system is positioned at the side of the longitudinal axis opposite to the position of the source of power.

In contradistinction to the brake structures referred to above, other brake structures, though fewer, are also available, which are provided with only one pull rod extending to the brake shoes, and the invention is also suitable for use in such connection.

In the first mentioned brake structures, it has already been proposed to include means adapted for variation of the ratio of leverage between the source of braking power and the shoes, and the function of these known means is based either on a displacement of an intermediate pull rod connecting the brake levers or on the employment of two or more intermediate pull rods adapted to be coupled to the levers for independent use according to will of the operator. In connection with brake structures provided with only one pull rod extending to the brake shoes it has also been previously proposed to obtain the same result by employment of different pivotal centres for the single brake lever at hand in this instance, such centres being adapted for independent use at will.

Nowadays, it is a condition that in case an arrangement is at hand for the variation of the braking power according to the amount of load, the mechanism herefore being termed an "empty-load device", it must be manipulatable by means of a simple manual reverse from the side of the car, and without the exercise of any substantial amount of power for the reversal. In an equalized brake structure, a displacement of the intermediate pull rod is unavoidably accompanied by a change of position of the other members of the brake rigging, and the movement of the latter requires a substantial amount of power (due to initial stress at hand, the presence of return spring, etc.). In such brake structures, as well as in structures adapted for connection of different pull rods, which latter embodiment cannot be used in brake systems according to the American type, the disadvantage is that the movement of reversal must be transmitted from the handle bar for the empty-load device mounted in a fixed bearing in the car framing to different points of the brake levers, which are movable in relation to said framing, the position of the same being besides indistinct and dependent on different amounts of wear of the brake shoes at the different axles, on the presence of adjusting means for the slack, on the manipulation of such means, and so forth.

The invention eliminates all of these disadvantages and refers in general to an empty-load device adapted both for equalized and not equalized brake structures whether they are of the American or the European type. The basic idea of the invention is to be found in that those members of the brake structure, which are intended to be set into action independently of each other for the purpose of serving as power transmission means at the different ratios of leverage, shall be constructed in such a manner that the connection of the same takes place at fixed points of the car framing, and that the points of the brake rigging members, at which the connection takes place, shall take a predetermined position in relation to the fixed connection points of the car framing, when the brake is released, irrespective of the amount of wear of the brake shoes and the variation of the position of the brake rigging members emanating therefrom.

A number of embodiments of the invention are illustrated in the accompanying drawings. Each of the figures represented therein, which figures about to be described in the following, shows one embodiment of the invention, and all of the figures are plan views of the different brake structures. For the purpose of facilitating a comparison, similar references are used on corresponding parts of construction in all of the figures.

In general aspect, the invention is characterized in that one or more additional levers are mounted in the brake rigging, each of such levers having a leverage corresponding to one of the desired ratios of leverage of the rigging, and this lever, or levers, is constructed in such a manner that it, or any one of them, may be set into or out of action as a power transmission member in the braking operation.

Fig. 4 is a plan view showing a modified form of the construction shown in Fig. 2.

Fig. 5 is a similar view adapted for the use of a pair of additional levers, either one of which being capable for use as a dead lever.

Fig. 6 is a similar view, the parts being in a reverse position of those shown in Fig. 4.

Figure 1:
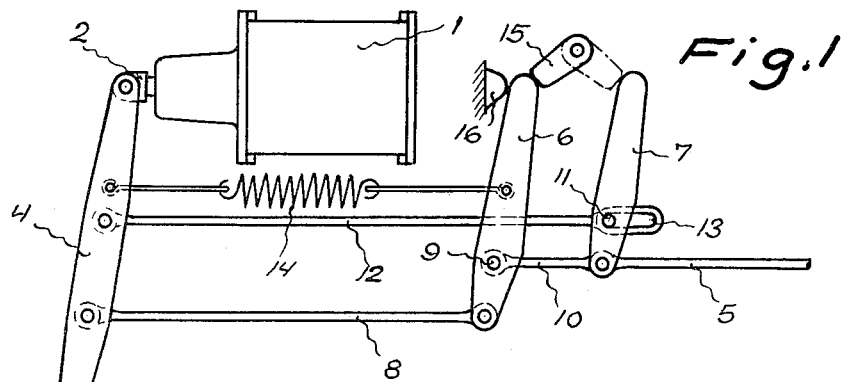
Figure 1 is a plan view showing the invention used in connection with a pair of additional levers, and devoid of a dead lever.

The embodiment according to Fig. 1 refers to a brake structure in which the braking power from the cylinder 1 is adapted to be transmitted by means of the brake lever 4 to the pull rod 5, in that the said lever at its one end is connected with the brake piston rod 2, and at its other end with a fixed point 3 of the car framing. In this instance, two additional levers 6 and 7 are employed, such levers having different leverages. At its one end the lever 6 is pivotally connected with an intermediate pull rod 8, and between its ends, at the pivotal centre 9, it is connected with the pull rod 5, by the intermediary of a pull rod 10. One end of the other additional lever 7 is also connected with the pull rod 5. The pivotal centre 11 of the lever 7 is connected with the lever 4 by means of a second intermediate pull rod 12 positioned parallel with the pull rod 8, and the pivot pin 11 on the lever 7 is surrounded by an oval bearing eye 13 on the pull rod 12. This bearing eye, if desired, can be positioned at the opposite end of the pull rod to effect the same result. A return spring 14 is mounted between the levers 4 and 6. At the ends opposite to the points of connection with the pull rods 5, 8 and 10, the levers 6 and 7 have no fixed bearings. An abutment 15 is mounted between their free ends and adapted to be reversed by means of a handle bar mounted at the side of the car, and such abutment may be made to take either of the positions shown in the drawings so as to form a support either for the lever 6 or for the lever 7. At its opposite side the lever 6 is also adapted to coact with a fixed abutment 16 for the purpose of limiting its movement that way.

It is self-evident, that in case the abutment 15 is rocked into the position shown in full lines, the upper end of the lever 6 is connected for action, and by means of the intermediate pull rod 8 the braking power will be transmitted to the pull rod 5 with a relatively greater leverage corresponding to the proportion of length between the arms of the lever 6. Then the pull rod 12 will be idling for a distance equal to the length of the eye 13 and corresponding to that part of the stroke, which the brake piston normally has to travel for advance of the brake shoes towards the wheels (slack stroke). Hereupon the piston will travel a small distance further only, and thereby the lever 7 is freely permitted to tilt, as the abutment 15 does not prevent such movement. When the abutment takes the position shown in dotted lines in the drawings, the braking power will be transmitted to the pull rod 5 by means of the intermediate pull rod 12 and the lever 7, whereby the lever 6 is permitted freely to tilt without taking part in the power transmission, and then the braking power is transmitted with a smaller leverage determined by the lever 7. The abutment 16 has no function per se in the transmission of the braking power, but it is provided due to the presence of the return spring 14, and in order that the end of the lever 6 coacting with the abutment 15 shall take a predetermined position when the brake is released.

Figure 2:
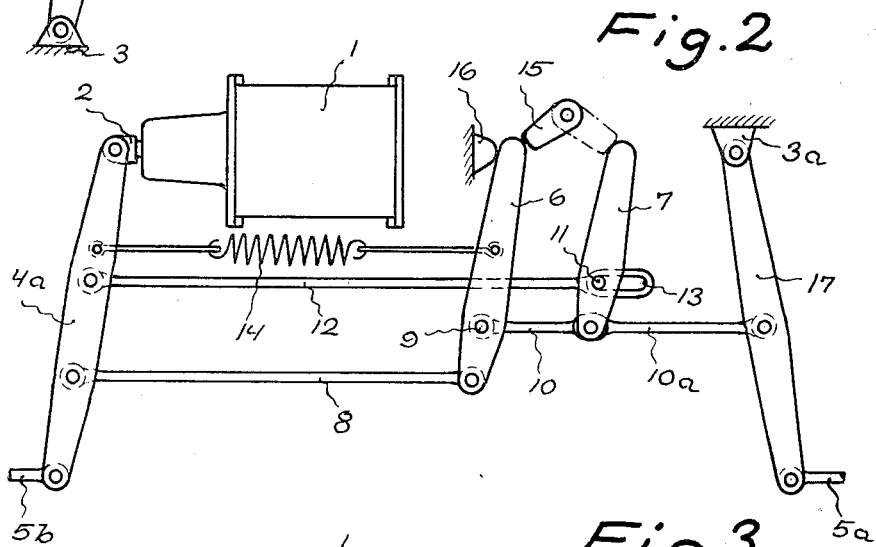
Fig. 2 is a similar view showing the device used in connection with a pair of levers and one dead lever.

Fig. 2 shows an adaption of the invention to an equalized brake structure according to the European type, and generally it differs from the embodiment described above in that respect only that the brake is provided with a second brake lever 17 (the "dead lever") coacting with a pull rod 5ª extending towards one of the car ends, whereas the brake lever 4ª (the "live lever") in this instance correspond to the lever 4 in Fig. 1 is adapted to coact with a pull rod 5ᵇ extending towards the other end of the car. The dead lever is pivoted to a fixed point 3ª of the car framing, and due to the presence of this lever the intermediate pull rod 10 between the levers 6 and 7 is extended by means of a pull rod 10ª connecting the lever 7 with the dead lever 17. The manner of action of this construction will naturally be the same as of the construction according to Fig. 1, the levers 6 producing the greater, and the lever 7 the smaller leverage when set into action, and the only difference being that the braking power is transmitted to both of the pull rods 5ª and 5ᵇ.

Figure 3:
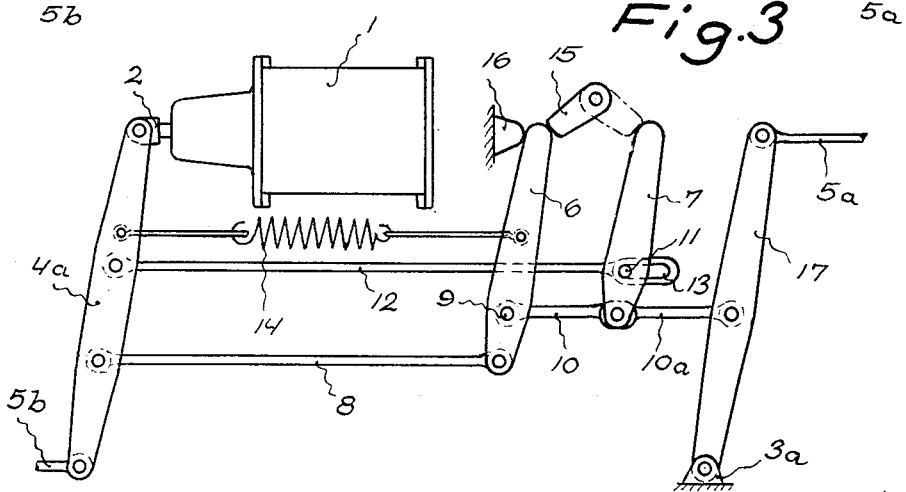
Fig. 3 is a similar view, showing the dead lever in a reverse position.

Fig. 3 shows an adaption of the invention to an equalized brake structure of the American type. This construction is entirely identical with that shown in Fig. 2, the only difference being that the dead lever 17 takes a reversed position so that the two pull rods 5ª and 5ᵇ are not positioned in alignment with each other. The manner of action is in this instance entirely identical with that referred to in connection with the constructon according to Fig. 2.

Fig. 4 shows a simplified embodiment of the invention applied to equalized brake structures of the European type, and in comparison with Fig. 2 the simplification is to be found in that the dead lever 17 adapted for transmission of the braking power with the greater leverage acting on the pull rod 5ª, whereas the live lever 4ª in the same manner as before serves for transmission of the power to the pull rod 5ᵇ. Hence, in this instance, one single additional lever 18 adapted for producing the smaller leverage is used in a construction provided for two ratios of leverage, such lever corresponding to one of the levers 6 or 7 in the Figures 2 and 3. At a pivot positioned between the ends of the same, the lever 18 by means of an intermediate pull rod 20, suitably provided with an oval eye 19, is connected with the live lever 4ª. An intermediate pull rod 22 is mounted parallel with the intermediate pull rod 20 between another point of the live lever 4ª and one end of the lever 18, the same end of the lever 18 by means of another pull rod 22ª being connected with the dead lever 17. The pivot pin 23 connecting the lever 18 with the pull rods 22 and 22ª is slidable in an oval aperture 21 in the rod 22, and the opposite end of the lever 18 is arranged to coact with a reversible abutment which may be brought in contact with the end of the lever 18 adapted for smaller leverage or removed therefrom. When the abutment 15 has been rocked into an inoperative position, the braking power by means of the pull rods 22 and 22ᵃ will be transmitted to the dead lever 17 adapted for greater leverage and the pull rod 5ᵃ in the ordinary manner, and thereby the lever 18 is fully free to move. When the abutment 15 is rocked into the operative position, the lever 4ᵃ will at first turn around the pivot pin for the pull rod 22, until the pivot pin for the pull rod 20 has approached the end of the oval eye 19. The length of said oval eye 19 is suitably adapted in such a manner that the movement referred to corresponds to the movement of approach of the brake shoes towards the wheels, i. e. a movement at which no substantial braking is effected. Hereafter the pivotal centre of the lever 4ᵃ will be shifted over to the pivot pin for the pull rod 20, and the actual braking is performed by transmission of the braking power by means of the pull rod 20, the lever 18, the pull rod 22ᵃ and the dead lever 17 to the pull rod 5ᵃ.

The embodiment according to Fig. 5 is a modification of that one shown in Fig. 4 in such a manner that the brake rigging contains no ordinary dead lever. In this case, two levers 24 and 25 are provided, and each of them may be connected at its one end in the direction of the stress so as to serve as a dead lever. For this purpose the structure is provided with two abutments 15ᵃ and 15ᵇ adapted alternately to coact with one end of the said levers, and such abutments may be mounted on a common shaft adapted for manual rotation. The two ends of the levers 24 and 25 positioned opposite to the abutments 15ᵃ and 15ᵇ are connected with the pull rod 5ᵃ, and in respect of the lever 24 the said connection is performed by means of an extension 5ᶜ of the said pull rod, such rod extension being connected with the lever 24 by means of an oval eye 26. In this instance, both of the levers are of an equal length, and the lever 24 is connected with the live lever 4ᵃ by means of an intermediate pull rod 27, the other lever 25 being connected with the said lever 4ᵃ by means of another intermediate pull rod 28 positioned parallel with the pull rod 27. In order to secure a predetermined position of the levers 24 and 25 when the brake is released, and a position in which the abutments 15ᵃ and 15ᵇ can freely be moved into the path of travel of the levers, a spring 29 is provided, such spring by means of a rod 30 provided with oval eyes 31 and 32 coacting with pins positioned at the ends of the levers 24 and 25 adapted for coaction with the abutments 15ᵃ and 15ᵇ. These oval eyes or slots 31 and 32 are adapted to permit the levers 24 and 25 a free movement independent of each other when the lever 25 is in action. If the abutment 15ᵃ is brought into operative position, the transmission of the braking power is effected with greater leverage by the pull rod 27, the lever 24 and the pull rod 5ᶜ to the pull rod 5ᵃ, and when the abutment 15ᵇ takes an operative position, the transmission of power is effected in a similar manner with a smaller leverage by the pull rod 28 and the lever 25 to the pull rod 5ᵃ. The abutment 15ᵇ may be constructed in such a manner that, when in operative position, a certain amount of play is at hand between the same and the corresponding end of the lever 25, when the brake is released. This amount of play serves a similar purpose as the eyes or apertures 13 and 19, respectively, referred to in the foregoing embodiments in relation to the maintainance of a constant length of the slack stroke of the brake piston when braking. In this instance, the intermediate pull rod 28 may be constructed without an oval eye as shown in the embodiment according to Fig. 5.

Referring finally to the embodiment according to Fig. 6, this embodiment is briefly spoken of as a reversal of the embodiment according to Fig. 4 in so far that the levers 17 and 18 are interchanged and have been given the same length, same as according to Fig. 5. The dead lever 33 is connected with the live lever 4ᵃ by means of an intermediate pull rod 34, and the additional lever 35, one end of which is adapted for coaction with the reversible abutment 15, is also connected with the lever 4ᵃ by means of an intermediate pull rod 36 positioned parallel with the rod 34. By means of a pull rod 5ᶜ positioned in the extension of the pull rod 5ᵃ and provided with an oval eye 26, the end of the additional lever 35 remote from the abutment 15 is connected with the free end of the dead lever 33. The manner of action is similar to that described in the foregoing, and when the abutment 15 is in operation, the braking power with smaller leverage is transmitted by the intermediate pull rod 36 and the lever 35, whereas the power is transmitted by the pull rod 34, the dead lever 33 and the pull rod 5ᶜ when the abutment 15 is inoperative, and then the structure acts with greater leverage.

By employment of more levers, by connection of the same with the live lever by means of a corresponding number of pull rods, and by the provision of corresponding abutments so that said levers may be set into or out of operation at will, it is evident that the brake rigging can also be built for more than two ratios of leverage, in case such a construction should be desired, and from a theoretical point of view it may be built for any number of ratios of leverage. Two or three different ratios of leverage may be considered entirely sufficient for practical purposes, however.

What I claim and desire to secure by Letters Patent is:—

1. In a vehicle brake mechanism, especially for railway cars, a source of braking power, friction members associated with wheels of the vehicles, a link and lever system brake power transmission rigging adapted for connecting said source of power with the friction members acting on the wheels for the purpose of braking, at least one additional power transmission lever mounted in the brake rigging and constructed for a fixed and non-variable leverage different from that of the other transmission levers in the rigging, and switch means adapted for selectively connecting and disconnecting said power transmission levers to produce different brake applying leverages.

2. In a vehicle brake mechanism according to claim 1, the additional feature that the switch means for the different levers consists of one abutment for each of the additional levers, said abutment being mounted in a fixed relation to the car framing and adapted to be reversed into or out of operative position, and, when in operative position, to form a pivot support for the lever to be connected.

3. In a vehicle brake mechanism according to claim 1, the additional feature that the power transmission levers in the brake rigging are interconnected by means of rods provided with means adapted to permit a certain amount of dead motion between the levers which are connectible and disconnectible as power transmission members.

FOLKE NILS HENRIK SETTERWALL.